United States Patent [19]

Schirmer et al.

[11] 4,385,490

[45] May 31, 1983

[54] COMBUSTORS AND METHODS OF OPERATING SAME

[75] Inventors: Robert M. Schirmer; Ellsworth H. Fromm, both of Bartlesville, Okla.

[73] Assignee: Phillips Petroleum Company, Bartlesville, Okla.

[21] Appl. No.: 220,210

[22] Filed: Dec. 23, 1980

Related U.S. Application Data

[63] Continuation-in-part of Ser. No. 933,344, Aug. 14, 1978, abandoned.

[51] Int. Cl.[3] .............. F02C 3/14; F02C 7/00

[52] U.S. Cl. .............. 60/39.23; 60/733

[58] Field of Search .............. 60/39.23, 732, 733, 60/749

[56] References Cited

U.S. PATENT DOCUMENTS

| | | | |
|---|---|---|---|
| 2,227,666 | 1/1941 | Noack | 60/39.07 |
| 2,659,201 | 11/1953 | Krejci | 60/39.65 |
| 3,451,216 | 6/1969 | Harding | 60/39.65 |
| 3,691,762 | 9/1972 | Ryberg et al. | 60/39.51 |
| 3,721,529 | 3/1973 | Kraus | 23/259.5 |
| 3,744,242 | 7/1973 | Stettler | 60/39.29 |
| 3,808,802 | 5/1974 | Tanasawa | 60/39.65 |
| 3,859,786 | 1/1975 | Azelborn et al. | 60/39.65 |
| 3,927,520 | 12/1975 | Arvin et al. | 60/39.65 |
| 4,006,589 | 2/1977 | Schirmer | 60/39.65 |
| 4,054,028 | 10/1977 | Kawaguchi | 60/39.65 |
| 4,151,711 | 5/1979 | Fromm et al. | 60/39.65 |

*Primary Examiner*—Louis J. Casaregola

[57] ABSTRACT

New combustors which produce lower emissions, particularly lower emissions of nitrogen oxides and CO, are provided. The combustors are provided with a first combustion region that is cylindrical, short and of small diameter and an adjacent downstream second combustion region comprising an abrupt enlargement in diameter to provide a relatively larger capacity than the first combustion region. A first stream of air is introduced, either radially, axially, or tangentially, into the first combustion region and the amount of said air is varied in accordance with fuel flow to the first combustion region. A second stream of air is introduced tangentially into the first combustion region. A third stream of air is introduced tangentially into the second combustion region. In preferred embodiments of the invention the air stream pressure drop across an air assist fuel nozzle is varied in accordance with fuel flow to the nozzle.

14 Claims, 13 Drawing Figures

COMBUSTORS AND METHODS OF OPERATING SAME

This is a continuation-in-part application of copending application Ser. No. 933,344, filed Aug. 14, 1978 (abandoned).

This invention relates to new combustors.

Since air pollution has become a major problem in the United States and other highly industrialized countries of the world, the control and reduction of pollution has become the object of major research and development effort by both governmental and nongovernmental agencies. Because it has been alleged, and there is supporting evidence, that automobiles employing conventional piston-type engines burning hydrocarbion fuels are a major contributor to pollution, vehicle emission standards have been set by the U.S. Environmental Protection Agency (EPA) which are sufficiently restrictive to cause automobile manufacturers to consider employing alternate engines instead of the conventional piston engine.

The gas turbine engine is being given serious consideration as an alternate engine. CO emissions in conventional gas turbine processes operated for maximum fuel combustion efficiency are not usually a problem. Nitrogen oxide emissions, usually referred to as $NO_x$, however, are a problem because the high temperatures generated in many prior art processes favor the production of $NO_x$. A gas turbine engine employed in an automobile or other vehicle must be operated over a wide range of varying operating conditions including idle, low speed, moderate speed, high speed, acceleration, and deceleration. These varying conditions create serious problems in controlling both $NO_x$ and CO emissions. Frequently, when a combustor is operated to control one of $NO_x$ or CO emissions, control of the other is lost. Both must be controlled. There is, therefore, a need for a realistically designed combustor which can be operated in a manner to meet EPA standards for pollutant emissions. Even a combustor giving reduced pollutant emissions approaching the EPA standards would be a great advance in the art. Such a combustor would have great potential value because it is possible the presently very restrictive EPA standards may be relaxed even further than has been recently indicated.

The present invention solves the above-described problems by providing new combustors which are designed to produce lower emissions, particularly lower emissions of nitrogen oxides (usually referred to as $NO_x$) and CO. The combustors of this invention can be operated over widely varying operating conditions with reduction and control of both $NO_x$ and CO emissions. In this invention the control of both $NO_x$ and CO emissions is accomplished by introducing a variable volume of a first stream of air into a first combustion region, and supplying tangentially introduced streams of air to both the first combustion region and a second combustion region of the combustor. The design of the first and second combustion regions of the combustors of U.S. Pat. Nos. 4,006,589 and 4,007,002 have been modified significantly to provide this alternative combustor design. In operation, the combustors of the invention are characterized by remarkable combustion stability over a wide range of operating conditions.

STATEMENT OF THE INVENTION

According to the invention, there is provided a combustor comprising, in combination: a flame tube; a dome member disposed at the upstream end of the flame tube; and air-assisted fuel inlet means disposed in the dome member for introducing a stream of fuel into an upstream first, short, small diameter cylindrical combustion section of the flame tube; a variable first air inlet means provided in the dome member for admitting a variable volume of a first stream of air through the dome member, around the fuel inlet means, and into the first combustion section of the flame tube; a second air inlet means disposed in the wall of the flame tube for tangentially admitting a second stream of air into the first combustion section tangential to the wall; a third stream inlet means disposed in the wall of said flame tube downstream from the second air inlet for tangentially admitting a third stream of air into a second cylindrical combustion section, having an abrupt enlargement in diameter, located in the flame tube downstream from, concentric with, and in communication with the first combustion section; and means for varying the presssure, or the volume, of a stream of assist air to the fuel inlet means in accordance with the rate of introduction of the fuel.

Further, according to the invention, there is provided a combustor comprising, in combinations: a flame tube; a dome member disposed at the upstream end of the flame tube; a fuel inlet means disposed in the dome member for introducing a fuel into an upstream first short, ssmall diameter cylindrical combustion section of the flame tube; a variable first air inlet means provided in the dome member for admitting a variable volume of a first stream of air through the dome member and into the first combustion section of the flame tube; a second air inlet means disposed in the wall of the flame tube for tangentially admitting a second stream of air into the first combustion section tangential to the wall; a third air inlet means disposed in the wall of the flame tube downstream from the second air inlet means for tangentially admitting a third stream of air into a second cylindrical combustion section having an abrupt enlargement in diameter located in the flame tube downstream from, concentric with, and in communication with the first combustion section; and an annular radially extending wall member extending into the flame tube adjacent the downstream edge of the third air inlet means.

In the preferred embodiment of this invention the abrupt enlargement of diameter between the first combustion section and the second combustion section provides a first combustion section that is of sufficiently lesser volume capacity as compared to the second combustion section to suppress combustion in the first combustion section under combustion mixing conditions that favor combustion in the first combustion section, i.e., under conditions of idle. It has been determined that this suppression of combustion in the first combustion section can be attained from the volume capacity of the first combustion chamber as compared to the second combustion chamber is in a ratio in a range of about 1:10 to about 1:50, preferably in a range of about 1:35 to about 1:45. The upper limit of the maximum size of the second chamber in comparison to the first chamber is affected by practical considerations as to the overall size of the combustor more than by considerations of the operation of combustor.

Referring now to the drawings, wherein like or similar reference numerals are employed to denote like or similar elements, the invention will be more fully explained.

Figure 1:
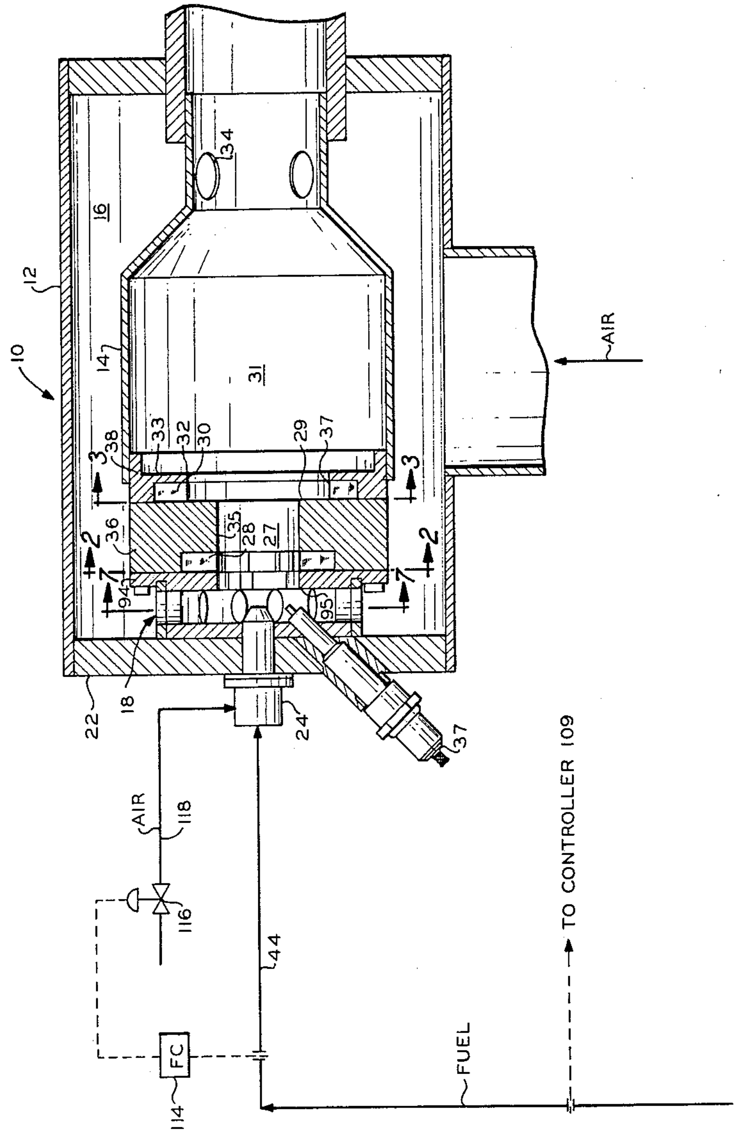
FIG. 1 is a view, partially in cross section, of a combustor in accordance with the invention.
Figure 3:
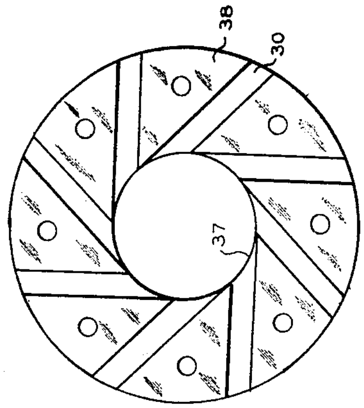
FIG. 3 is an enlarged view, in elevation taken along the line 3—3 of FIG. 1 and illustrating another set of tangential entry ports or slots.
Figure 2:
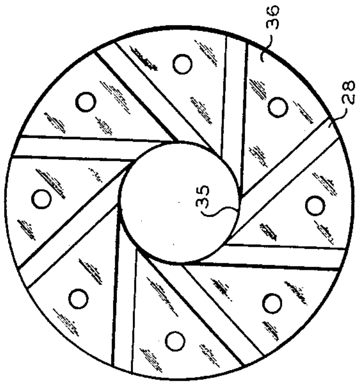
FIG. 2 is an enlarged view, in elevation, taken along the line 2—2 of FIG. 1 and illustrating another set of tangential entry ports or slots.

FIGS. 1-7, inclusive, 9, and 10 illustrate a combustor in accordance with the invention. The combustor is denoted generally by the reference numeral 10. Preferably, the combustor comprises an outer housing or casing 12 having a flame tube 14 disposed, preferably concentrically, therein and spaced apart from the casing to form an annular chamber 16 between the casing 12 and the flame tube 14. The flame tube can be supported in the housing or casing by any suitable means. While it is preferred to provide the combustor with an annular casing or housing, as illustrated, to provide the annular space 16 for supplying air to the various inlets (described hereinafter) in the flame tube, it is within the scope of the invention to alter the configuration of the housing or casing, or to omit the housing or casing and supply the air inlets by means of individual conduits. The flame tube 14 is provided at its upstream end with a dome member 18. A fuel inlet means is provided for introducing a stream of fuel into the upstream end portion of the flame tube. As illustrated in FIG. 1, the fuel inlet means comprises a fuel conduit 44 leading from a source of fuel and extending into communication with fuel nozzle 24 mounted in fuel flange 22 which closes the upstream end of casing 12. The fuel nozzle extends into the dome member 18. An annular orifice means, disposed on the downstream side of the dome member 18, can preferably be formed integrally with said dome member as here illustrated. A first shoulder 95 abruptly narrowing the combustion passage can be considered to define the outlet from the dome member 18 and the inlet into the first combustion region 27.

A variable first air inlet means is provided in the dome member for admitting a variable volume of a first stream of air through the dome member, around the fuel inlet nozzle 24, and into the first combustion region 27 of the flame tube. As hereinafter described, the variable first air inlet means comprises at least one air passage means of variable cross-sectional area provided in and extending through the dome member 18 into communication with the first combustion region 27, and means for varying the cross-sectional area of the air passage means and thus controlling the volume of the first stream of air admitted to the first combustion region. A second air inlet means is disposed in the wall of the flame tube for tangentially admitting a second stream of air into the first combustion region 27 tangential to the wall. The second air inlet means preferably comprises a plurality of tangential slots 28 extending through the wall of the upstream end portion of the flame tube 14 at a first station in the flame tube adjacent the outlet from the dome member 18.

A third air inlet means is disposed in the wall of the flame tube downstream from the second air inlet means for tangentially admitting a third stream of air into a second combustion region 31 located in the flame tube 14 adjacent, downstream from, and in communication with the first combustion region 27. The third air inlet means preferably comprises a plurality of tangential slots 30 extending through the wall of an intermediate portion of the flame tube 14 at a second station in the flame tube adjacent and downstream from a second shoulder 29 which abruptly expands the combustion passage and can be considered to define the outlet from the first combustion region. A third shoulder 32 is disposed in the flame tube downstream affording a second abrupt expansion of the flame tube from tangential slots 30. Preferably, a fourth air inlet means, comprising at least one opening 34, is provided in the wall of the flame tube at a station downstream from third air inlet means 30 and the third shoulder 32 for admitting a fourth stream of air comprising quench or dilution air into the flame tube 14.

Flame tube 14 can be fabricated integrally if desired. However, for convenience in fabrication, the flame tube can preferably be formed with its wall divided into separate sections similarly as here illustrated. Thus, in one preferred embodiment the tangential slots 28 can be formed in an upstream first wall section 36 of the flame tube, preferably in the upstream end portion of the first wall section with the downstream wall of the shoulder 95 forming the upstream walls of slots 28. In this preferred embodiment the second shoulder 29 is formed in the downstream end portion of the first wall section 36. In said preferred embodiment the tangential slots 30 can be formed in an intermediate second wall section 38 located adjacent and downstream from the first wall section 36. Preferably, the second wall section 38 is disposed with its upstream edge contiguous to the downstream edge of the first wall section 36, and the tangential slots 30 are formed in the upstream end portion of the second wall section 38 with the downstream edge of the first wall section 36 forming the upstream walls of the slots 30. In this preferred embodiment the third shoulder 32 is formed in the second wall section 38 and is downstream of the slots 30 formed therein. The inner wall surface of the first wall section 36 is cylindrical from the first shoulder 95 to the second shoulder 29. The second wall section 38 comprises an annular radially extending wall member 33 which expands abruptly to form a cylindrical flame tube from the third shoulder 32 and with the upstream surface of said wall member 33 comprising at least a portion of the downstream walls of said slots 30. Said annular wall member 33 and third shoulder 32 provide for the abrupt expansion of hot combustion products flowing from first combustion region 27 to second combustion region 31.

It will be understood that the combustors described herein can be provided with any suitable type of ignition means and, if desired, means for introducing a pilot fuel to initiate combustion. For example, a spark plug 37 can be mounted to extend through flange 22 and the upstream end of dome member 18 as shown.

Referring to FIG. 1, for example, in the combustors of the invention the first combustion region can be considered to be the region from the downstream tip of fuel nozzle 24 to the midpoint of the tangential slots 30, and the second combustion region can be considered to be the region from the midpoint of the tangential slots 30 to the midpoint of the openings 34.

The upstream flame section 27 and the downstream flame section 31 have been illustrated as being circular in shape and this is usually preferred. However, it is within the scope of the invention for either or both of these flame sections to have other shapes. Similarly, flame tube 14 and the various sections thereof will usually be generally circular in cross-section and this is preferred. However, it is within the scope of the invention for the flame tube to be other than circular in cross-section, e.g., hexagonal.

Referring now to FIGS. 4, 5, 6, and 7, the dome member 18 can comprise a fixed generally cylindrical member 80 (see FIG. 6) closed at one end and open at the other end. A plurality of openings 82 are provided at spaced apart locations around the circumference of the cylindrical member 80 adjacent the closed end thereof. An opening 84 is provided in the closed end for receiving a fuel inlet nozzle, e.g., nozzle 24 of FIG. 1, which extends through the flange 22 of housing or outer casing 12. The outlet of this fuel nozzle could be positioned similarly as shown for nozzle 24 in FIG. 1. The fuel inlet nozzle can be any suitable type of fuel nozzle. As here shown it is an air assist fuel nozzle of conventional design in which air is used in atomizing the fuel. Another opening 88 is provided in the closed end for receiving an igniter means, such as spark plug 37 in FIG. 1, which also extends through the flange 22. Openings 92 are provided for receiving mounting bolts (not shown) for mounting the dome member on the flange 22 and within housing or casing 12. Preferably, a mounting flange 94 is connected to and provided around the open end of the cylindrical member 80 for mounting member 80 on the upstream end of a flame tube, e.g., flame tube 14 in FIG. 1. Preferably, a groove 96 is provided in the flange 94 around the open base of cylindrical member 80. A pair of spaced apart stop pins 98 project from flange 94 perpendicular thereto and adjacent cylinder member 80. An orifice 95, preferably cylindrical is provided in flange 94 adjacent and in communication with the open end of cylindrical member 80. Flange 94 comprises a shoulder means with the shoulder 95 defining the outlet from the dome member.

Figure 7:
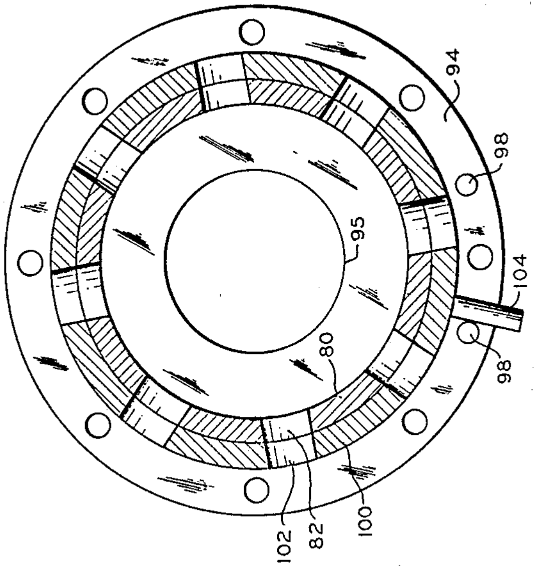
FIG. 7 is a sectional view taken along the line 7—7 of FIG. 1.
Figure 5:
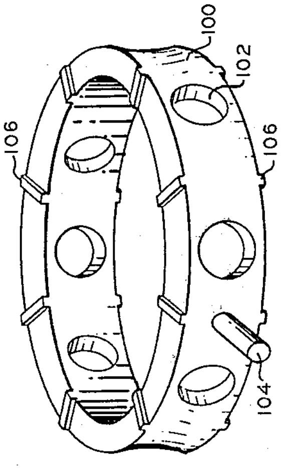
FIG. 5 is a perspective view further illustrating an element of the dome member of the combustor of FIG. 1.
Figure 6:
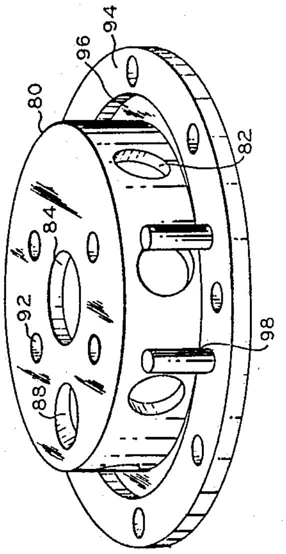
FIG. 6 is a perspective view further illustrating another element of the dome member of the combustor of FIG. 1.
Figure 10:
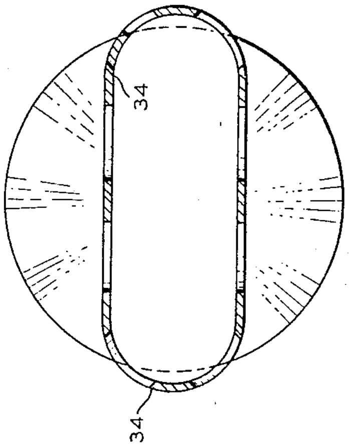
FIG. 10 is a sectional view taken along the line 10—10 of FIG. 9.
Figure 9:
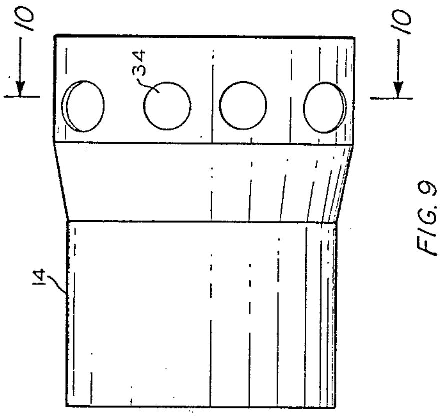
FIG. 9 is a top plan view of the downstream portion of the flame tube of the combustor of FIG. 1.

The adjustable throttle ring 100 of FIG. 5 is mounted around cylindrical member 80 and is provided with a plurality of spaced apart openings 102 therein of a size, number, and shape and at spaced apart locations, corresponding to the openings 82 in cylindrical member 80. The throttle ring fits into groove 96 in flange 94. An actuator pin 104 projects outwardly from the outer surface of the throttle ring 100 and coacts with the stop pins 98 to limit the movement of the ring 100. Friction lugs 106 can be provided on the top and the bottom of the ring 100 for movably bearing against the inner surface of flange 22 in housing 12 and the bottom of groove 96, respectively. FIG. 7 is a cross section of ring 100 mounted on member 80.

Figure 8:
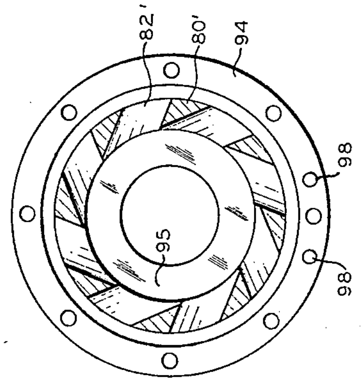
FIG. 8 is a sectional view, taken through a location corresponding to that of FIG. 7, and illustrating features of another dome member which can be employed on the combustors of the invention and in the operation of the combustors.

FIG. 8 illustrates a modified cylindrical member 80' which can be employed in a modification of the dome or closure member 18. The modified cylindrical member 80' is essentially like the cylindrical member 80 shown in FIGS. 6 and 7 except that openings 82' in the modified cylindrical member 80' extend tangentially therethrough instead of radially. It will be understood that the corresponding openings in the corresponding modified throttle ring (not shown) which is employed with the modified cylindrical member 80' are correspondingly tangential.

In accordance with the invention, it has been found that when the combustors of the invention are provided with air assist fuel inlet nozzles, or with any other air assist fuel introduction means, it is desirable to control the amount of air supplied to the fuel nozzle in accordance with the fuel flow to the nozzle. Any suitable control means can be employed for this purpose and the specific means illustrated in FIG. 1 forms no part, per se, of the invention and can be modified or substituted for as desired. As shown diagrammatically in FIG. 1, the flow controller 114 actuates valve 116 in air conduit 118 responsive to the flow of fuel through the orifice in fuel conduit 44 to program an increase in air flow to nozzle 24 to accompany an increase in fuel flow, or vice versa. The valve 116 can be a flow control valve for controlling volume of flow, or a pressure regulator valve for holding a constant pressure in the conduit downstream therefrom and to fuel nozzle 24.

Figure 4:
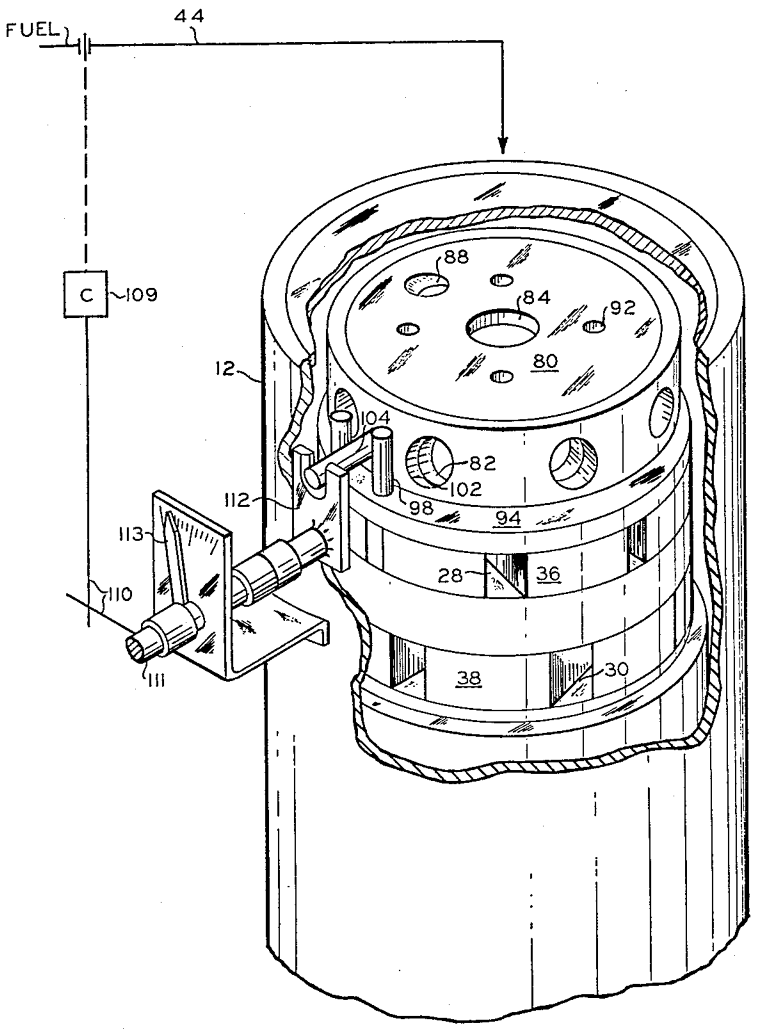
FIG. 4 is a diagrammatic perspective view, partially cut away, of the upstream end of the combustor of FIG. 1 showing the flame tube and dome member of the combustor, and further illustrating certain operational features thereof.

Further in accordance with the invention, it has been found that when the combustors of the invention are provided with variable dome means, such as dome 18 in FIGS. 1 and 4, it is desirable to control the effective open area of the air inlet openings in the dome member in accordance with fuel flow to the combustor. Any suitable control means can be provided for this purpose and, referring now to FIG. 4, the specific means there illustrated forms no part, per se, of the present invention and can be modified or substituted for by any means known in the art. As shown diagrammatically in FIG. 4, controller 109, responsive to the flow of fuel through the orifice in fuel conduit 44, actuates linkage 110, which is operatively connected to control rod 111, and programs rotation of the control rod in one direction or the other. Yoke member 112 is fixed to the inboard end of rod 111 inside of housing 12. The U-shaped recess in one end of yoke member 112 coacts with actuator pin 104 to cause rotation of throttle ring 100 within the limits of the space between stop pins 98 and thus adjusts the effective size of the opening provided by openings 82 and 102. As here shown, the openings 82 and 102 are in direct register with each other to provide the maximum opening into dome member 18. Indicator pin 113 is provided to indicate the degree of rotation of throttle ring 100.

In one method of operating the combustors of the invention, e.g., the combustor of FIG. 1, a first stream of air is introduced through dome member 18 at a controlled rate into first combustion region 27 of the combustor. In the combustor of FIG. 1 this first stream of air is introduced generally radially with respect to the first combustion region. It is, however, within the scope of the invention to introduce this first stream of air in an axial direction. A stream of fuel is introduced, preferably axially, into the first combustion region 27. In one embodiment, the fuel is sprayed into the first combustion region as a hollow cone and the first stream of air is introduced around the stream of fuel and intercepts this cone. The rate of introduction of the first stream of air is controlled in accordance with the rate of introduction of the stream of fuel, as described elsewhere herein.

A second stream of air is tangentially introduced into the first combustion region 27 via tangential slots 28 in a direction tangential the wall of the first combustion region. Slots 28 impart a swirl to the second stream of air. The direction of the swirl can be either clockwise or counter-clockwise. When employing the slots illustrated in FIG. 2, the direction of swirl will be clockwise, looking downstream in the flame tube. The first and second streams of air form a combustible mixture with the fuel, and at least partial combustion of the mixture is caused in the first combustion region. Hot combustion products and any remaining mixture are passed from first combustion region 27, through orifice 29, and into second combustion region 31.

A third stream of air is tangentially introduced into the second combustion region via tangential slots 30 in a direction tangential the wall of the second combustion region. Slots 30 impart a swirl to this third stream of air. The direction of swirl imparted to the third stream of air can be either clockwise or counter-clockwise, but is preferably opposite the direction of swirl imparted to the second stream of air by slots 28. When employing the slots illustrated in FIG. 3, the direction of swirl of the third stream of air will be counter-clockwise, looking downstream of the flame tube. The third stream of air surrounds the hot combustion products and any remaining mixture entering from the first combustion region, and mixes therewith. Combustion is essentially completed in the second combustion region.

Preferably, a fourth stream of air is introduced via openings 34 and mixes with combustion products leaving the second combustion region. The fourth stream of air comprises quench or dilution air. The hot combustion gases then exit the combustor to a turbine or other utilization.

Figure 12:
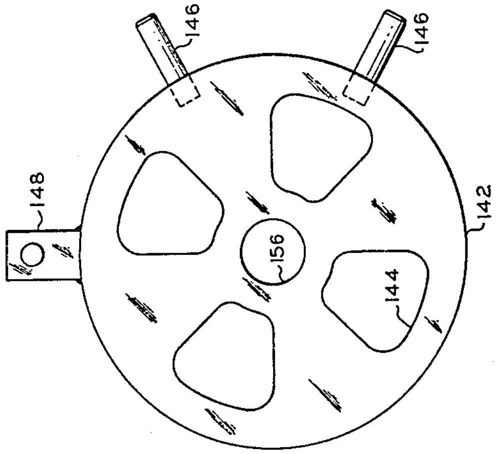
FIG. 12 is an enlarged view in elevation of an element of the dome member shown in FIG. 11.
Figure 13:
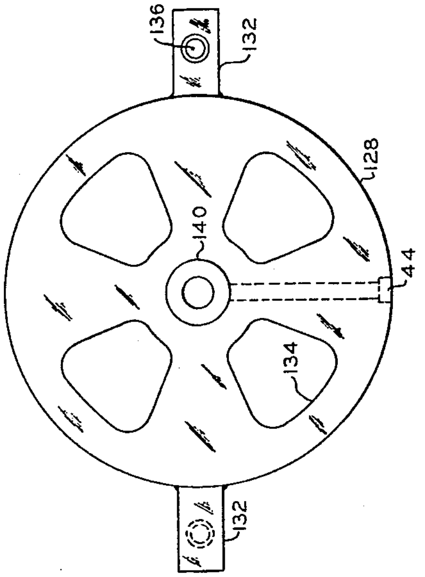
FIG. 13 is an enlarged view in elevation of another element of the dome member shown in FIG. 11.

Any other suitable variable dome means can be employed, in combination, in the combustors of the invention instead of the above-described dome member 18. For example, referring to FIGS. 11, 12, and 13, the dome member can comprise a dome menber 120 which comprises a fixed circular back plate 128 centrally mounted, by means of a pair of mounting bars 132, in an opening provided in a fuel flange 130. A plurality of spaced apart openings 134, arranged in a circle, are provided in plate 128. A stop pin 136 projects perpendicularly from one of the bars 132. Referring to FIG. 1, flame tube 14 can be mounted in a tubular housing to provide an annular space 16 between the flame tube and the housing. The housing can be provided with a suitable flange adjacent the upstream end of the flame tube for connecting to the downstream side of the fuel flange 130. The upstream side of the fuel flange 130 can be connected to a suitable flange which in turn is connected to the end of an air conduit supplying air to annular space 16. The back or downstream side of fixed plate 128 can be joined to the upstream side of flame tube 14, similarly as flange 94 is joined in FIG. 1. Opening 138 in fuel flange 130 can then be in communication with annular space 16 and the air conduit for admitting air to annular space 16. A centrally disposed circular boss member 140 projects outwardly from the upstream face of fixed plate 128 for receiving and mounting a front adjustable plate 142 thereon.

Front plate 142 is circular, and of the same size as, fixed plate 128. A plurality of spaced apart openings 144 are provided in front plate 142 and correspond in size and circular arrangement to openings 134 in backplate 128. A pair of spaced apart stop pins 146 project perpendicularly from the side of front plate 142. An actuator tab 148 projects perpendicularly from one side of the front plate at a location spaced from the stop pins 146. Push rod 150 is pivotally connected to actuator tab 148 in any suitable manner as shown. Push rod 150 can be actuated in a back and forth manner by means of a roller mechanism 152 mounted on the outside of fuel flange 130 in any suitable manner. Flexible shaft 154 extends through a control panel (not shown) and is connected to a rotatable knob (not shown) for movement of shaft 154, roller mechanism 152, and rod 150 for rotating front plate 142 within the limits imposed by stop pins 146 acting against stop pin 136.

Figure 11:
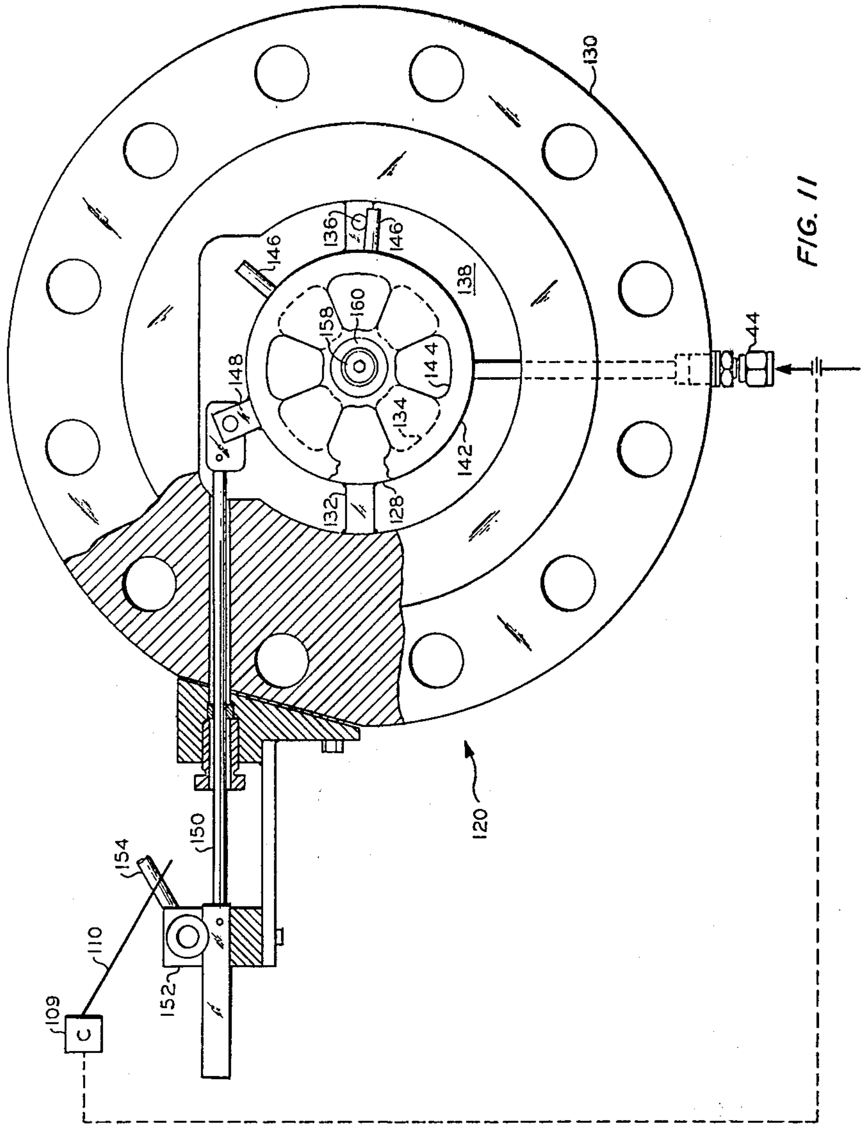
FIG. 11 is a view looking at the upstream side of another variable dome member which can be employed in the combustors of the invention.

In assembly, fuel flange 130 is mounted between suitable adjacent flanges as described above. The upstream end of flame tube 14 is joined to flanges as described above. The upstream end of flame tube 14 is joined to backplate 128 directly as described above or by means of a suitable adaptor which in turn is secured to the downstream face of fuel flange 130. Fuel conduit 44 extends through flange 130 and communicates with a central cavity therein which is adapted to receive fuel nozzle 24. The central opening 156 in front plate 142 fits onto boss member 140 on backplate 128 and front plate is held in sliding engagement with backplate 128 by means of cap screw 158 and washer 160. Push rod 150, by virture of the back and forth movement described above, rotates front plate 142 to bring openings 144 therein into and out of register with openings 134 in backplate 128 to vary the effective size of opening provided in variable dome 120 and vary the amount of air passed through the dome into first combustion section 27. As shown in FIG. 11, openings 144 and 134 are out of register and the dome member is completely closed.

As discussed above in connection with the combustor of FIG. 1 and its variable dome member 18, it is also desirable to control the effective size of the openings in the variable dome 120 in accordance with fuel flow to the combustor to which it is connected. This can be accomplished manually by means of the push rod 150 and associated elements. However, in continuously operating combustors which operate over a varied range of operating conditions, such as a driving cycle, it is desirable that the effective size of the dome openings be controlled automatically. Any suitable control means can be provided for this purpose, for example, the control means described above and illustrated in FIG. 4. This control means can be adapted to a combustor provided with a dome member 120 by providing an orifice in fuel conduit 44, operatively connecting the orifice to a controller unit 109, and operatively connecting the controller unit by a suitable linkage 110, to shaft 154 of rack and roller mechanism 152 which moves push rod 150 back and forth.

In the above-described methods of operation the relative volumes of the various streams of air can be controlled by varying the sizes of the openings, relative to each other, through which streams of air are admitted to the flame tube of the combustor. The above-described variable dome 18 of FIG. 1 and the variable dome of FIGS. 11, 12, and 13 can be employed to control the volume of the stream of air from the dome to the first combustion region. Flow meters of calibrated orifices can be employed in conduits supplying the other streams of air, if desired.

It is within the scope of the invention to operate the combustors or combustion zones employed in the practice of the invention under any conditions which will give the improved results of the invention. For example, it is within the scope of the invention to operate the combustors or combustion zones at suitable inlet air temperatures up to about 1500° F. (816° C.), or higher; at pressures within the range of from about 1 to about 40 atmospheres, or higher; at flow velocities within the range of from about 1 to about 500 feet per second, or higher; and at heat input rates within the range of from about 30 to about 1200 Btu per pound of air. Generally speaking the upper limit of the temperature of the air streams will be determined by the means employed to heat same, e.g., the capacity of the regenerator or other heating means, and materials of construction in the combustor and/or turbine utilizing the hot gases from the combustor. Generally speaking, operating conditions in the combustors of the invention will depend upon where the combustor is employed. For example, when the combustor is employed with a high pressure turbine, higher pressures and higher inlet air temperatures will be employed in the combustor. The invention, therefore, is not limited to any particular operating conditions. As a further guide to those skilled in the art, presently preferred operating ranges for other variables or parameters are: heat input, from 30 to 500 Btu/lb. of total air to the combustor; combustor pressure, from 3 to 10 atomospheres; and reference air velocity, from 50 to 250 feet per second.

The relative volumes of the above-described first, second, third, and quench or dilution air streams will depend upon the other operating conditions. Generally speaking, the volume of the first stream of air introduced into the first combustion region can be in the range of from 0 to 50, preferably about 0 to about 30, volume percent of the total air to the combustor when operating over a driving cycle, including idling, low speed, moderate speed, high speed, acceleration, and deceleration; the volume of the second stream of air can be in the range of from 0 to about 15, preferably about 5 to about 12, volume percent of the total air to the combustor; and the volume of the third stream of air can be in the range of from about 5 to about 25, preferably about 8 to about 18, volume percent of the total air to the combustor. When operating under substantially "steady state" conditions, such as in a stationary power plant or in turnpike driving, the volumes of said streams of air will depend upon the load, or the chosen speed of operation. The volume of the dilution or quench air can be any suitable amount sufficient to accomplish its intended purpose.

The air pressure to the air assist fuel nozzle, or other air assisted fuel introduction means, can be in the range of from 1 to 100, preferably 2 to 15, psig greater than the combustor operating pressure, preferably measuring the combustor pressure by the inlet air pressure to the combustor.

While in most instances, the first stream of air, the second stream of air, the third stream of air, and the dilution or quench air will originate from one common source such as a single compressor, it is within the scope of the invention for these streams of air to originate from different or separate sources. Separate heating means can be provided for heating the various streams of air.

A number of advantages are realized in the practice of the invention. The combustors of the invention are low emission combustors. The invention provides small compact combustors which are particularly well suited to be employed in locations where space is important, e.g., under the hood of an automobile. Yet, the principles involved and the advances provided by the invention are applicable to combustors employed in larger power plants, e.g., large stationary gas turbine engines, boilers, etc. The variable domes employed in combination with the flame tubes in the combustors of the invention contribute to the overall efficiency of the combustors of the invention. The variable dome is located in a relatively cool low stress region of the combustor, e.g., at the upstream end of the flame tube. The variable dome is a small component comprising only one movable element which operates with only a small movement from a closed position to an open position. Rapid response to changing operating conditions is readily provided. This combination of a variable dome with relatively small flame tubes in combustors of the invention renders the combustors of this invention particularly well suited for mobile installations. In contrast, the "variable hardware" of the prior art combustors usually provides for adjustments at a plurality of locations in the combustors, including adjustments to the hot flame tube itself. The result is usually a large, bulky, unit which in practical operation functions poorly, if at all.

While it is not intended to limit the invention as to any theories of operation, it definitely appears that the combustors of the invention are, to a large extent at least, self adjusting in operation. By this it is meant that the fuel-air mixtures produced and burned have characteristics of adjusting or varying in accordance with fuel flow. Referring to FIG. 1, at low fuel flows, e.g., idling, the flame stabilizes in the first combustion region 27. It is believed that the air introduced via tangential entry slots 28 has radial flow components, and other flow components, as well as the major tangential flow components. These flow components apparently cause the creation of flame holding vortex actions and stabilizes the flame in the first combustion region 27. As fuel flow increases, and the amount of air introduced through the dome increases, the flame approaches shoulder 29 and the other tangential air entry slots 30, a core of flame and hot combustion products is developed, and some of the air introduced via slots 30 become involved. Under these conditions the core is isolated along the axis of the flame tube by the clockwise swirl of the air introduced via slots 28. As fuel flow and dome air flow increase further, the core passes shoulder 29, past slots 30, and past shoulder 32. The clockwise swirl is neutralized by the counter-clockwise air from slots 30, and the flame stabilizes in second combustion region 31 adjacent and downstream from wall member 33. At high fuel flows and high dome air flows the flame penetrates further into the second combustion region 31 and is stabilized in the large central portion thereof. When the fuel flow is cut back, the flame retreats through the flame tube, the core is reformed, and the flame again stabilizes in the first combustion region because the dome air is also cut back when the fuel is cut back.

The above-described actions of the flame in the combustion process of the invention are, to a large extent at least self-adjusting actions which are functions of the amount of fuel introduced, the control of the amount of dome air introduced in accordance with the amount of fuel, and the tangentially introduced second and third streams of air. As shown hereinafter, the combustors of the invention and the combustion process of the invention produce low emissions of $NO_x$, CO and HC. Thus, the invention solves one of the most serious problems in the design and operation of combustors and combustion processes for the production of low emissions, i.e., the problem of how to handle effectively the wide range of introduced air required when the combustor is operated over a wide range of conditions such as a driving cycle as described herein. This solution is provided by the invention combination comprising: fuel injection, variable first air stream injection, tangential second air stream injection into a first combustion region; and tangential third air stream injection into a second combustion region, with abrupt enlargement of diameter from one combustion region to the next.

The following example will serve to further illustrate the invention.

EXAMPLE 1

A run is calculated evaluating the performance of the combustor of this invention. The configuration of the combustor is essentially like that illustrated in FIG. 1. Design details for this combustor are set forth in Table I below. Test conditions for evaluating combustor performance are set forth in Table II below with the calculated performance of the invention combustor set forth in Table III. Comparison performance of the combustor on which present invention is an improvement is set forth in Table IV. Comparison is made with combustor B from U.S. Pat. No. 4,006,589. For purposes of further comparison of the inventive combustor with that of the patent, U.S. Pat. No. 4,006,589 is hereby incorporated by reference into this disclosure.

TABLE I

COMBUSTOR DESIGN

| | |
|---|---|
| Dome Air | Heated |
| Inlet Type | Radial |

TABLE I-continued

COMBUSTOR DESIGN

| | |
|---|---|
| Dist. from fuel inlet, in. | 0 |
| Hole size, in. | 0.75 × .75 |
| No. of holes | 8 |
| Total hole area, sq. in. | 0. to 4.50 |
| Exit orifice, diam. in. | 2.00 |
| Exit orifice area, sq. in. | 3.14 |
| Fuel Nozzle | Air Assist |
| Spray Pattern | Cone |
| Spray Angle, deg. | 70 |
| Air pressure, psia | 5 |
| Flame Tube | |
| 1st Station Air | Heated |
| Inlet type | Tangential |
| Distance from fuel inlet, in. | 0.75 |
| Slots, in. | 0.38 × 0.50 |
| No. of slots | 8 |
| Total slot area, sq. in. | 1.50 |
| % Total combustor hole area | 12.5 to 36.3 |
| Exit orifice, diam. in. | 2.00 |
| Exit orifice area, sq. in. | 3.14 |
| 2nd Station Air | Heated |
| Inlet type | Tangential |
| Distance from fuel inlet, in. | 2.50 |
| Slots, in. | 0.25 × 0.5 |
| No. of slots | 8 |
| Total slot area, sq. in. | 1.00 |
| % Total combustor hole area | 8.20 to 6.04 |
| Exit orifice, diam. in. | 2.50 |
| Exit orifice area, sq. in. | 4.91 |
| 3rd Station Air | Heated |
| Inlet type | Radial |
| Distance from fuel inlet, in. | 10.50 |
| Total hole area, sq. in. | 9.55 |
| % Total combustor hole area | 79.3 to 57.7 |
| Combustor length, in. | 12.0 |
| Combustor inside diam. in. | 6.125 |
| 1st Comb. section, in. | 2.0 |
| 2nd Comb. section, in. | 8.5 |
| Combustor, volume, cu. in. | 219 |
| 1st Comb. section, cu. in. | 5 |
| 2nd Comb. section, cu. in. | 195 |
| Combustor hole area, sq. in. | 12.05 to 16.55 |
| % Combustor Exit Area | 88.96 to 122.19 |

TABLE II

TEST CONDITIONS FOR EVALUATING COMBUSTOR PERFORMANCE

| | Combustor Operating Conditions | | | | | |
|---|---|---|---|---|---|---|
| Simulated Driving Cycle Operating Mode | Time, % Total | Inlet Air Pressure, in. Hg abs. | Inlet Air Temp., F. | Air[a] Flow, lb/sec. | Fuel[b] Flow, lb/hr. | Estimated Outlet Gas Temp., F. |
| Engine Braking | 11.4 | 46 | 1050 | 0.80 | 7 | 1220 |
| Curb idle[c] | 36.1 | 46 | 975 | 0.75 | 10 | 1225 |
| Low Road Load[c] | 37.9 | 56 | 1150 | 0.96 | 17 | 1460 |
| High Road Load[c] | 8.8 | 78 | 1150 | 1.34 | 30 | 1540 |
| Compressor Acceleration | 5.8 | 58 | 1100 | 1.00 | 75 | 2400* |

*Steady operation at this high temperature will damage the combustor; therefore, emissions were measured at this condition with a fuel flow rate of 20, 30, and 40 lbs/hr. These data were used to estimate emissions at the desired fuel flow of 75 lbs/hr by extrapolation.

[a]Absolute humidity controlled at 75 grains of water vapor per pound of dry air.

[b]ASTM Jet A aviation-turbine kerosine.

[c]Curb idle = 0 to less than about 20 miles per hour; Low road load = from about 20 to about 40 mph; High road load = greater than about 40 mph.

TABLE III

PERFORMANCE OF COMBUSTOR

| | Emission Index gm Pollutant/ kgm fuel | | | Comb. Press Drop | Fuel noz. air Press[g] | Dome Open Area, % |
|---|---|---|---|---|---|---|
| | $NO_x$ | CO | HC | % | psi | Total[e] |
| Deceleration | 0.96[h] | 18.3 | 0.24 | 2.6 | 5 | 8.7 |
| Idle | 0.91[h] | 5.90 | 0.28 | 2.1 | 5 | 11.4 |
| Low Load | 0.26 | 7.11 | 0.19 | 1.9 | 5 | 16.9 |
| High Load | 3.01 | 13.61 | 0.37 | 1.9 | 5 | 19.6 |
| Acceleration[a] | 3.35 | 0 | 0 | — | 5 | — |

TABLE III-continued

PERFORMANCE OF COMBUSTOR

| | Emission Index gm Pollutant/ kgm fuel NO$_x$ | CO | HC | Comb. Press Drop % | Fuel noz. air Press[g] psi | Dome Open Area, % Total[e] |
|---|---|---|---|---|---|---|
| Fed. Driving Cycle, Emission Ratio[b] | 1.25[h] | 0.58 | 0.13 | | | |

[a]Extrapolated data.

[b] $\frac{\text{Amount of pollutant emitted over Fed Driving Cycle}^{(c)}}{\text{Amount of pollutant permitted by 1976 Statutory Requirement}^{(d)}}$

[c]Calculated for 10 mpg fuel economy.

[d]0.4 g/mi NO$_x$, 3.4 g/mi CO, and 0.41 g/mi HC.

[e]Percent of total open area, dome plus flame tube.

[g]Greater than combustor pressure.

[h]Calculated data.

TABLE IV

PERFORMANCE OF COMBUSTOR B

| Simulated Driving Conditions | Emission Index gm Pollutant/ kgm Fuel NO$_x$ | CO | HC | Comb. Press. Drop % | Fuel Noz. Air Press[g] psi | Dome Open Area, % Total[e] |
|---|---|---|---|---|---|---|
| Deceleration | 3.27 | 18.34 | 0.24 | 2.6 | 5 | 8.7 |
| Idle | 3.10 | 5.90 | 0.28 | 2.1 | 5 | 11.4 |
| Low Load | 0.26 | 7.11 | 0.19 | 1.9 | 5 | 16.9 |
| High Load | 3.01 | 13.61 | 0.37 | 1.9 | 5 | 19.6 |
| Acceleration[a] | 3.35 | 0 | 0 | — | 5.0 | — |
| Fed. Driving Cycle, Emission ratio[b] | 1.59 | 0.58 | 0.13 | | | |

See footnotes of Table III.

The present invention modifies the configuration of Combustor B of U.S. Pat. No. 4,006,589 to suppress fuel droplet burning in the first combustion section at low fuel flows, while the air and fuel are being mixed. The basic configuration of the first combustion section has been reduced in size from 17 cubic inches in U.S. Pat. No. 4,006,589 to 5 cubic inches in the present invention. Therefore, residence time in the first combustion section is reduced to 5/17 of that in Combustor B of U.S. Pat. No. 4,006,589 and the amount of NO$_x$ generated will be reduced proportionally because of the shorter residence time. However, this reduction in NO$_x$ is credited to the performance of the invention only when operating under those conditions where the stoichiometry favors combustion within the first section; that is, under Deceleration and Idle operating conditions.

CO and HC emissions are not affected by the smaller first combustion section of the invention because CO and HC are burned in the second combustion section. The second combustion section is not changed from Combustion B of U.S. Pat. No. 4,006,589.

I claim:

1. A combustor, comprising, in combination:

a flame tube:

a dome member disposed at the upstream end of said flame tube; an air-assisted fuel inlet means disposed in said dome member for introducing a stream of fuel into an upstream first, cylindrical, combustion section of said flame tube;

a variable first air inlet means provided in said dome member for admitting a variable volume of a first stream of air through said dome member, around said fuel inlet means, and into said first combustion section of said flame tube;

a second air inlet means disposed in the wall of said flame tube for admitting a second stream of air into said first combustion section in a circumferential direction and tangential to the wall thereof;

a third air inlet means disposed in the wall of said flame tube downstream from said second air inlet means for admitting a third stream of air into a second, cylindrical, combustion section in a circumferential direction and tangential to the wall thereof, said second combustion section being located in said flame tube downstream from, concentric with, and in communication with said first combustion section said second section having an abrupt enlargement of diameter so that the volume capacities of the first combustion section to the second combustion section being in a ratio in a range of about 1:35 to about 1:45; and means for varying the pressure, or the volume, of a stream of assist air to said fuel inlet means in accordance with the rate of introduction of said fuel.

2. A combustor according to claim 1, comprising, in further combination:

an outer casing; and wherein said flame tube is disposed in said casing and spaced apart therefrom to form an annular chamber between said casing and said flame tube; and said second air inlet means and said third air inlet means are each in communication with said annular chamber for respectively admitting said second and third streams of air into said flame tube from said annular chamber.

3. A combustor according to claim 2 wherein said variable first air inlet means disposed in said dome member comprises:

at least one air passage means of variable cross-sectional area provided in and extending through said dome member into communication with said first combustion section; and means for varying the cross-sectional area of said air passage means and thus controlling the volume of said first stream of air admitted to said first combustion section.

4. A combustor according to claim 3 wherein said means for varying the cross-sectional area of said air passage means in said dome member includes means for varying said cross-sectional area in accordance with the rate of flow of fuel to said combustor.

5. A combustor according to claim 3 wherein said air passage means in said dome member extends axially therethrough for admitting said first stream of air in an axial direction with respect to said first combustion section and coaxially with respect to said fuel inlet means.

6. A combustor according to claim 3 wherein said air passage means in said dome member extends radially therethrough for admitting said first stream of air in a radial direction with respect to said first combustion section and said fuel inlet means.

7. A combustor according to claim 3 wherein:

an annular wall means is disposed on the downstream side of said dome member, and a first orifice formed in said wall means defines the outlet from said dome member;

said second air inlet means comprises a first plurality of tangential slots extending through the wall of the upstream end portion of said flame tube adjacent said outlet from said dome member;

a second orifice is disposed in said flame tube downstream from said first tangential slots;

said third air inlet means comprises a second plurality of tangential slots extending through the wall of an intermediate portion of said flame tube adjacent and downstream from said second orifice; and a third orifice is disposed in said flame tube adjacent and downstream from said second tangential slots.

8. A combustor according to claim 2 wherein:

an annular wall means is disposed on the downstream side of said dome member, and a first orifice formed in said wall means defines the outlet from said dome member;

said second air inlet means comprises a first plurality of tangential slots formed in an upstream first wall section of said flame tube and adjacent the upstream end of said wall section;

a second orifice is formed in said first wall section adjacent the downstream end thereof;

said third air inlet means comprises a second plurality of tangential slots formed in an intermediate second wall section and adjacent the upstream end of said second wall section, with said second wall section being located adjacent and downstream from said first wall section; and a third orifice is formed in said second wall section adjacent and downstream from said tangential slots therein.

9. A combustor according to claim 8 wherein:

said annular wall means comprises a flange comprising the downstream end of said dome member;

said first wall section comprises the upstream end portion of said flame tube, and said first tangential slots formed in said first wall section are formed in the upstream end portion thereof with the downstream wall of said flange forming the upstream walls of said first slots;

said second wall section is disposed with its upstream edge contiguous to the downstream edge of said first wall section, and said second tangential slots formed in said second wall section are formed in the upstream end portion thereof with the downstream edge of said first section forming the upstream walls of said second slots;

and third orifice formed in said second wall section adjoins said second tangential slots formed therein; and an annular radially extending wall member extends into said flame tube adjacent the downstream edge of said second tangential slots, and said third orifice is formed in said wall member.

10. A combustor according to claim 9 wherein a fourth air inlet means is provided in the wall of said flame tube downstream from said third air inlet means for admitting a fourth stream of air comprising quench or dilution air into said flame tube.

11. A combustor, comprising, in combination:

a flame tube;

a dome member disposed at the upstream end of said flame tube;

a fuel inlet means disposed in said dome member for introducing a fuel into an upstream first, cylindrical, combustion section of said flame tube;

a variable first air inlet means provided in said dome member for admitting a variable volume of a first stream of air through said dome member and into said first combustion section of said flame tube;

a second air inlet means disposed in the wall of said flame tube for admitting a second stream of air into said first combustion section in a circumferential direction and tangential to the wall thereof;

a third air inlet means disposed in the wall of said flame tube downstream from said second air inlet means for admitting a third stream of air into a second, cylindrical, combustion section in a circumferential direction and tangential to the wall thereof; said second combustion section being located in said flame tube downstream from, concentric with, in communication with said first combustion section said second section having an abrupt enlargement of diameter so that said first section is of short length and small diameter as compared to the second combustion section the volume capacities of the first combustion section to the second combustion section being in a ratio in a range of about 1:35 to 1:45; and an annular radially extending wall member extending into said flame tube adjacent the downstream edge of said second tangential slots.

12. A combustor according to claim 11 comprising in further combination:

an outer casing; and wherein said flame tube is disposed in said casing and spaced apart therefrom to form an annular chamber between said casing and said flame tube, and said second air inlet means and said third air inlet means are each in communication with said annular chamber for respectively admitting said second and third streams of air into said flame tube from said annular chamber.

13. A combustor according to claim 12 wherein said variable first air inlet means disposed in said dome member comprises:

at least one air passage means of variable cross-sectional area provided in and extending through said dome member into communication with said first combustion section, and means for varying the cross-sectional area of said air passage means and thus controlling the volume of said first stream of air admitted to said first combustion section.

14. A combustor according to claim 13 wherein:

an annular wall means is disposed on the downstream side of said dome member, and a first orifice formed in said wall means defines the outlet from said dome member;

said second air inlet means comprises a first plurality of tangential slots extending through the wall of the upstream end portion of said flame tube adjacent said outlet from said dome member;

a second orifice is disposed in said flame tube downstream from said first tangential slots;

said third air inlet means comprises a first plurality of tangential slots extending through the wall of an intermediate portion of said flame tube adjacent and downstream from said second orifice; and a third orifice is disposed in said flame tube adjacent and downstream from said second tangential slots.

* * * * *